United States Patent

[11] 3,602,034

| [72] | Inventor | Patrick L. Powell<br>Franklin Park, Ill. |
|---|---|---|
| [21] | Appl. No. | 850,077 |
| [22] | Filed | Aug. 14, 1969 |
| [45] | Patented | Aug. 31, 1971 |
| [73] | Assignee | Stewart-Warner Corporation<br>Chicago, Ill. |

[54] SPEEDOMETER CALIBRATION APPARATUS
2 Claims, 6 Drawing Figs.

| [52] | U.S. Cl. | 73/2 |
|---|---|---|
| [51] | Int. Cl. | G01c 25/00 |
| [50] | Field of Search | 73/2, 507, 519, 520 |

[56] References Cited
UNITED STATES PATENTS

| 1,080,308 | 12/1913 | Stewart | 73/2 |
|---|---|---|---|
| 1,611,089 | 12/1926 | Wallis | 73/2 |
| 1,816,581 | 7/1931 | Helgeby | 73/520 X |
| 2,273,848 | 2/1942 | Ely et al. | 73/520 X |

FOREIGN PATENTS

| 561,088 | 5/1960 | Belgium | 73/520 |
|---|---|---|---|

Primary Examiner—Louis R. Prince
Assistant Examiner—William A. Henry, II
Attorneys—Augustus G. Douvas, William J. Newman and Norton Lesser ABSTRACT: A calibration arrangement for an eddy cup-type speedometer is disclosed in which a magnetic shunt is carried on a bearing sleeve located on a magnet shaft, with the shunt located intermediate the frame backwall and the shaft magnet. A spring biases the shunt against rotation relative to the magnet. Aligned apertures in the frame and housing backwalls located radially outwardly of the magnet shaft and radially inwardly of the shunt periphery enable receipt of a tool for engaging a rearwardly extending tang on the shunt to hold the shunt against rotation while the magnet is rotated to thereby adjust the angular relationship between the magnet and shunt for calibrating the speedometer.

PATENTED AUG 31 1971
3,602,034
SHEET 1 OF 2
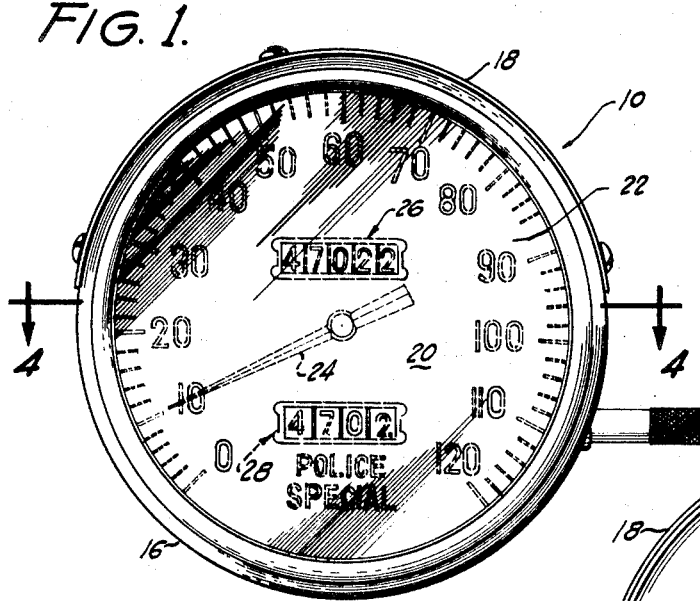
FIG. 1.
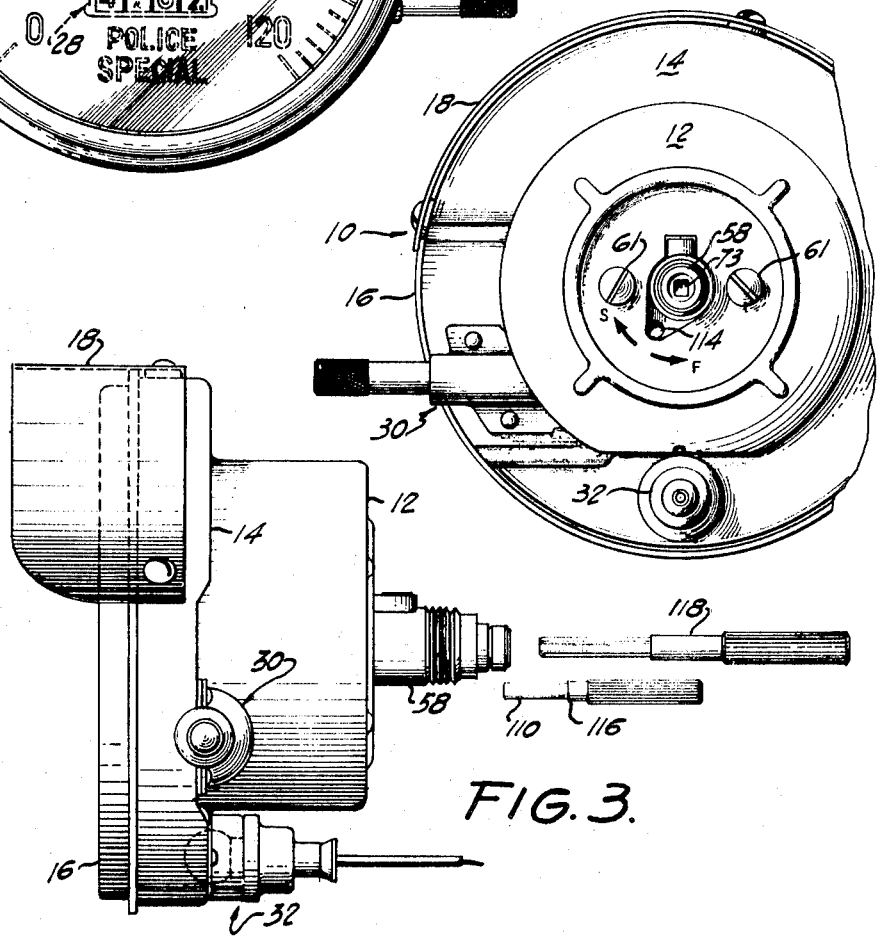
FIG. 2.
FIG. 3.
INVENTOR
Patrick L. Powell
By. Morton Lesser
ATTORNEY.

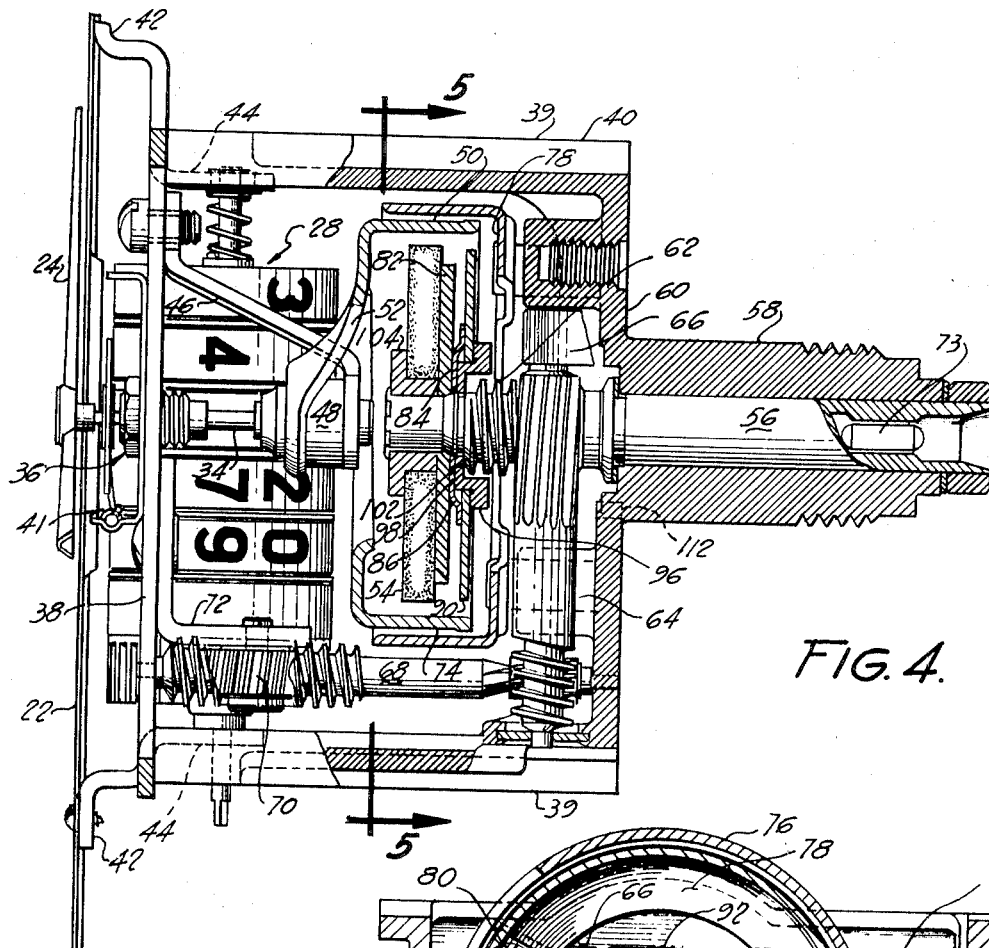
FIG. 4.
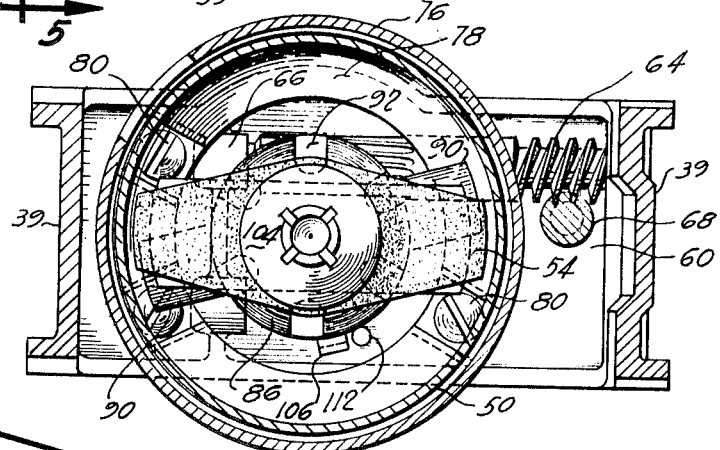
FIG. 6.
FIG. 5.
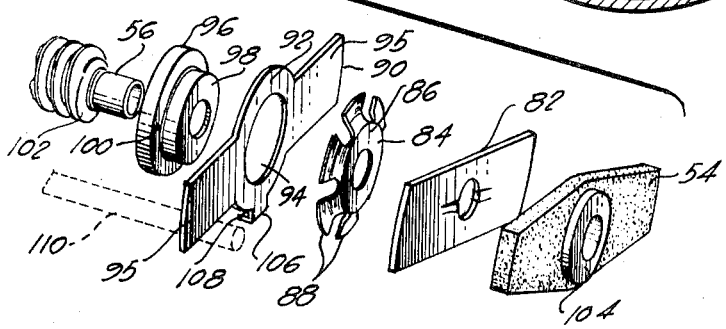
INVENTOR
Patrick L. Powell
By Norton Lesser
ATTORNEY 3,602,034

SPEEDOMETER CALIBRATION APPARATUS

BACKGROUND OF THE INVENTION

1. Field of the Invention

This invention relates in general to speedometer calibration and more particularly to a method and apparatus for simple field calibration of police speedometers.

2. Description of the Prior Art

Police speedometers are periodically calibrated by initially checking the speed registered by the speedometer against a standard. If the registered speed differs from the standard, it is usually necessary to separate the bezel from the case to provide access to the regulator assembly. The regulator assembly has a torsion spring which is adjusted for controlling the pointer shaft bias and therefore the reaction of the shaft and pointer to the rotational speed of the magnet shaft. The separation of the bezel and case and their subsequent reassembly is relatively time consuming and requires special tools for proper assembly.

SUMMARY OF THE INVENTION

The present invention proposes to enable field calibration of the speedometer through the use of an adjustably positioned magnetic shunt that normally rotates with the speedometer magnet shaft and magnet. The shunt is rotatably positioned relative the magnet under spring bias so that the insertion of a simple rod for holding the shunt while the magnet is rotated adjusts their relative angular position to create a change in the speed registered by the speedometer in order to properly calibrate the same.

It is, therefore, among the objects of the present invention to provide an improved and more economical method and apparatus for calibrating speedometers in the field.

BRIEF DESCRIPTION OF THE DRAWINGS

FIG. 1 is a front elevational view of a speedometer;

FIG. 2 is a rear elevational view of the speedometer shown in FIG. 1 and partially broken off;

FIG. 3 is a side elevational view of the speedometer shown in FIG. 1 together with the shunt adjustment apparatus;

FIG. 4 is a sectional view taken generally along the line 4—4 in FIG. 1 with the case, bezel, glass, for example, omitted;

FIG. 5 is a sectional view taken generally along the line 5—5 in FIG. 4; and

FIG. 6 is an isometric view of a portion of the magnet shaft assembly.

DESCRIPTION OF THE PREFERRED EMBODIMENT

Referring now to FIGS. 1-3, a speedometer is indicated therein by the reference character 10. The speedometer includes a cup-shaped case or housing 12 having a stepped peripheral flange 14 at the open end. A bezel 16 and an arcuate hood or bracket 18 overlapping the bezel are mounted along the outer edge of the axial portion of flange 14. The bezel 16 conventionally secures a glass plate 20 to the front end of the housing 12 to permit viewing of a speedometer dial 22 marked with indicia for indicating speed in accordance with the position of a pointer 24. Spaced openings are provided adjacent the vertical axis of the dial through which respective odometer assemblies 26 and 28 may be viewed. Odometer assembly 28 is a trip odometer, which may be reset to zero at the end of each trip by means of a reset assembly 30. A lamp assembly 32 is extended through the radial wall of the stepped flange to light the speedometer dial 22, when necessary.

Pointer 24 is carried on a reduced end of a pointer shaft 34 seen in FIG. 4. The pointer shaft 34 is journaled adjacent the reduced end in a bearing assembly 36 located in a plate 38. Plate 38 is fastened across an opening defined by the ends of side legs 39 of a U-shaped frame bracket 40. The plate 38 has a pair of forwardly extending ears 42 at opposite ends for supporting the dial 22 and rearwardly extending tangs such as 44 located above and below the central axis for supporting the shafts of respective odometer assemblies 26 and 28 and, in addition, conventionally engages the ears formed on the brackets between the odometer dials. A torsion spring or regulator assembly 41 connects the plate 38 to the pointer shaft 34 and the tension of the spring is adjusted at the factory to properly zero the pointer shaft 34 together with the pointer or indicator 24.

An arm 46 on the frame plate 38 extends rearwardly and carries a bearing assembly 48 for rotatably supporting the end of the pointer shaft 34 opposite the reduced end. An aluminum speed cup 50 is cantilever supported beyond the end of shaft 34 by means of an arm 52 fastened to shaft 34. The speed cup is driven by a bar magnet 54 approximately 1¼ inch long and fixed to the end of a magnet shaft 56. The magnet shaft 56 is journaled in an externally threaded boss 58 extending rearwardly from the rear leg 60 of the U-shaped frame bracket 40. Screw holes are provided in leg 60 for fastening the frame bracket 40 and associated apparatus to the case by means of screws 61.

Gear teeth 62 are formed on shaft 56 intermediate the magnet 54 and boss 58 for coupling with teeth on a shaft 64 suitably journaled in one of the sidewalls 39 of bracket 40 and a boss 66 formed on wall 60. Shaft 56 therefore drives shaft 64 which transfers its rotation through appropriate gearing to a shaft 68 coupled to a drive wheel (not shown) of one odometer assembly 26 and through an idler gear 70 below shaft 68 to the trip odometer assembly 28. The gear 70 is rotatably supported by an arm 72 suspended from the plate 38. Shaft 68 is suitably journaled in wall 60 and in plate 38.

The shaft 56 has a conventional recess 73 therein for receiving the tip of a flexible shaft (not shown) which serves to drive the shaft 56 and thereby the shafts 64 and 68 and the odometer assemblies 26 and 28 for registering vehicle mileage. A casing for the flexible shaft is fastened to the boss 58 by means of a threaded ferrule nut and the external threading on the boss.

The speed cup 50 has a rim 74 which is nestingly received between the ends of bar magnet 54 and a generally annular field piece 76 having a back wall 78 defining a central opening through which the magnet shaft extends. Screws 80 fasten the back wall 78 through suitable standards to the back wall 60 of the frame bracket 40.

A temperature compensator 82 of flat generally rectangular stock about one-sixteenth inch thick and formed of nickel, silicon, carbon and iron material is located directly behind the magnet 54. The compensator 82 shunts only a small portion of the flux from magnet 54 and butts against an annular portion 84 of a phosphor bronze spring member 86 having a plurality of spring tines 88 projecting radially therefrom and inclined axially rearward for engaging against a magnetic shunt 90. The shunt 90 is a generally rectangular bar of steel approximately 0.03 inch thick spaced approximately three thirty-seconds inch to one-eight inch from the magnet 54 and having an annular portion 92 of approximately 0.7 inch diameter adjacent the central axis for engaging the tines 88 and defining a central aperture 94 of approximately 0.44 inch diameter. Shunt arms 95 projecting from the portion 92 render the shunt substantially the same length as the magnet 54 and compensator 82 all of which nest within the speed cup rim 74. The central aperture 94 receives a bearing shunt or an annular sleeve 96 of 0.43 inch diameter, which encircles the magnet shaft 56 and has spaced radial walls 98 and 100 with the wall 98 being of smaller diameter than wall 100.

Wall 98 butts against a shoulder 102 on the magnet shaft 56 and is fixed thereto by a shouldered annular staking member 104 whose end butts against the compensator 82 to hold the annular portion 84 of spring 86 against wall 98. The shoulder on member 104 holds the magnet 54 against the compensator 82. Thus, the magnet 54, compensator 82 and spring member 86 and sleeve 96 are fixed to and rotate with the magnet shaft 56 while the spring tines 88 force the shunt 90 back against wall 100 so that the shunt is normally constrained to rotate with shaft 56, but can also rotate about sleeve 96 independently of shaft 56 and magnet 54, if the force of spring 86 is overcome. Thus, the shunt 90 shunts a proportion of the flux generated by magnet 54 from the speed cup 50 with the maximum proportion shunted when the shunt and magnet are parallel and the minimum is shunted when the shunt and magnet are at 90° to each other.

To facilitate independent movement between shunt 90 and shaft 56 an L-shaped tang 106 depends and extends radially outwardly from the annular portion 92 of the shunt at 90° to arms 95. The tang 106 has an end leg 108 extending axially rearwardly for engagement with the end portion of a rod or short cylindrical tool 110. The tool 110 is utilized for altering or adjusting the speedometer calibration and is inserted through an aperture 112 in the rear leg 60 of frame bracket 40 in alignment with a suitable aperture 114 in the back wall of the case or housing 12. The tool 110 is inserted until a shoulder 116 thereon engages the back leg 60 of bracket 40 to align the end of tool 110 axially with leg 108. Aperture 112 is radially positioned so that the end of tool 110 engages shunt portion 92 and cannot move past the same. A rod 118 having a noncircular end which fits recess 73 is also inserted in recess 73 to enable normal manual rotation of the shaft 56 and magnet 54.

The speedometer is periodically calibrated by driving the magnet shaft at a speed corresponding to a known speed to pivot the speed cup 50 and shaft 34 and observe the position of pointer 24. If the pointer is not properly positioned, tool 110 is inserted in the recess 73 of the magnet shaft 56. The tool 110 is an elongate rod having one end shaped to correspond to the recess of shaft 56 and the other end is knurled to facilitate manual rotation. The tool 110, which is also knurled, is inserted through aligned apertures 112 and 114 in the frame bracket 40 and case 12, respectively, until shoulder 116 thereon engages the frame bracket 40.

Rotation of the magnet shaft 56 in clockwise direction by tool 118, as seen in FIG. 2 and indicated by indicia S on the back of case 12, to decrease the speedometer reading, causes the magnet 54, compensator 82 and shunt 90 to rotate together until the tang leg 108 strikes the tool 110. The magnet shaft 56, magnet 54 and compensator 82 continue to rotate, but the shunt 90 being restrained by tool 110, remains stationary thereby shifting the angular position of arms 95 of shunt 90 relative the poles of the magnet 54 to decrease the distance therebetween until the ends of the shunt are parallel with the ends of magnet 54. This parallel position provides the maximum decrease in speed registration of up to 3 miles per hour and smaller decreases are provided by simply terminating the change in angular position before the parallel position is reached as soon as the proper registration is achieved. If rotated beyond the parallel position, the shunt 90 of course causes the speedometer reading to increase.

To increase the reading normally the magnet shaft 52 is rotated counterclockwise by tool 118 as seen in FIG. 2 and indicated by the indicia F on the case 12, until the tang leg 108 strikes the tool 110. Thereafter the shunt 90 is prevented from rotation as explained while the magnet 54 rotates to increase the angular distance between the magnet poles and shunt 90 with the maximum increase of up to 3 miles per hour is provided when the shunt arms 95 and the ends of magnet 54 are at 90° to each other.

What I claim is:

1. A speedometer comprising a bar magnet, a magnet shaft carrying said magnet at one end and adapted to be driven at a speed corresponding to the speed of a vehicle in which said speedometer is carried, a speed cup, a pointer shaft coaxial with said magnet shaft and carrying said cup adjacent said magnet whereby said pointer shaft is rotated to a position corresponding to said speed for indicating said speed in response to rotation of said magnet, a U-shaped frame bracket having a rearwardly extending boss on the back leg of said bracket for rotatably supporting said magnet shaft with said magnet and speed cup located between the side legs of said bracket, a temperature compensator located axially of said magnet shaft adjacent one side of said magnet, a spring member having tines projecting axially of said magnet shaft, a shunt on said magnet shaft located axially intermediate said magnet and the back leg of said U-shaped bracket and engaged by said tines for biasing said shunt axially of said magnet shaft in one direction from said magnet, a bearing sleeve encircling said magnet shaft and rotatably supporting said shunt and having a pair of radial walls with said shunt biased against one of said walls, means forcing said magnet, compensator, spring and said other radial wall axially against said shaft for fixing said magnet relative said shaft and for holding said shunt angularly fixed relative said magnet under spring tension only for shunting a proportion of the magnetic field of said magnet from said cup in accordance with the angular position of said shunt relative said magnet, and a cup-shaped housing encircling said U-shaped bracket with said housing having a back wall spaced adjacent said frame back leg and said boss extending through said back wall, said frame bracket back leg and said back wall each having an aperture in axial alignment with each other spaced radially outwardly of said magnet shaft and radially inwardly of said shunt periphery for receipt of a tool to enable said shunt to be held against rotation during rotation of said magnet whereby the angular position of said shunt relative said magnet is altered.

2. A speedometer of the type including a bar magnet located adjacent one end of a magnet shaft adapted to be driven at a speed corresponding to the speed of a vehicle in which said speedometer is carried and magnetically coupled to a speed cup fixed to a pointer shaft for pivoting said pointer shaft to a position corresponding to said speed for indicating said speed, the improvement comprising a frame bracket for rotatably supporting said magnet shaft, a temperature compensator located axially of said magnet shaft adjacent one side of said magnet, a spring member having tines projection axially of said magnet shaft, a shunt engaged by said tines for biasing said shunt axially of said magnet shaft in one direction from said magnet, a bearing sleeve encircling said magnet shaft for rotatably supporting said shunt and having a pair of radial walls with said shunt biased against one of said walls, means forcing said magnet, compensator, spring and said other radial wall against said shaft for fixing said magnet relative said shaft and for holding said shunt fixed relative said magnet under spring tension for shunting a proportion of the magnetic field of said magnet from said cup in accordance with the angular position of said shunt relative said magnet, said frame bracket having an aperture located radially outwardly of said magnet shaft and radially inwardly of said shunt periphery for receiving a tool, and a tang extending from said shunt and having a leg extending axially of said magnet shaft toward said aperture for engagement with said tool whereby said shunt is held against stationary during rotation of said magnet to alter the angular position of said shunt relative said magnet.